O. KARCHER.
CLIPPER.
APPLICATION FILED APR. 6, 1911.
1,011,808.
Patented Dec. 12, 1911.
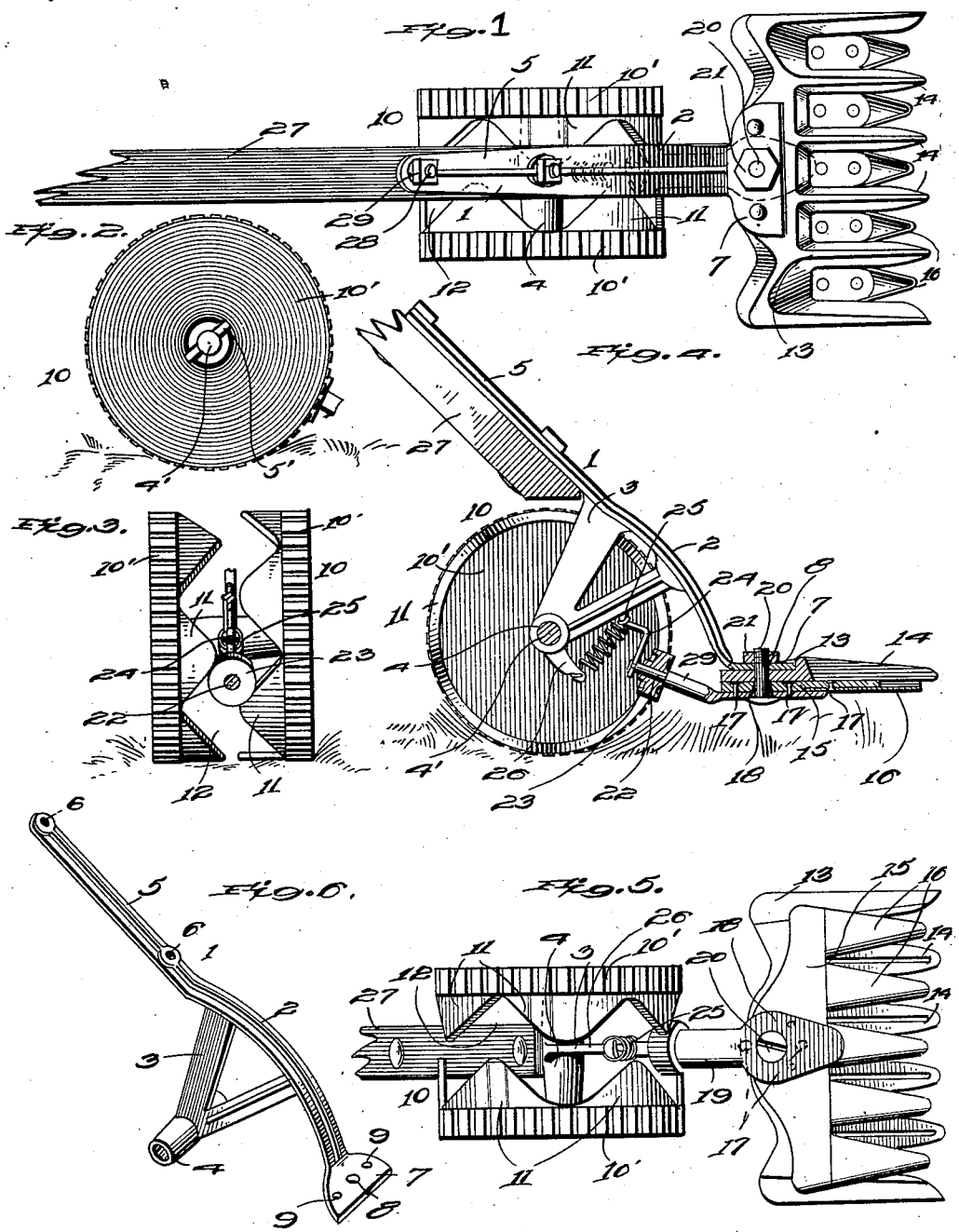
WITNESSES
INVENTOR
Otto Karcher.
Attorney.
COLUMBIA PLANOGRAPH CO., WASHINGTON, D. C.

UNITED STATES PATENT OFFICE.

OTTO KARCHER, OF CANTON, OHIO.

CLIPPER.

1,011,808.   Specification of Letters Patent.   Patented Dec. 12, 1911.

Application filed April 6, 1911.   Serial No. 619,367.   

*To all whom it may concern:*

Be it known that I, OTTO KARCHER, a citizen of the United States, residing at Canton, in the county of Stark and State of Ohio, have invented certain new and useful Improvements in Clippers, of which the following is a specification, reference being had therein to the accompanying drawing.

This invention relates to lawn mowers and has special reference to that class of lawn mowers provided with reciprocating cutting blades.

The invention has for its object to provide an improved lawn mower having reciprocating cutting blades, the lower blade being so constructed and arranged that the blades will be pressed together during their operation so as to effectively operate.

The invention further has for its object to provide a lawn mower having a simple supporting frame.

The invention further has for its object to provide an improved lawn mower constructed with a set of fixed teeth, and a set of reciprocating cutting teeth so constructed and arranged as to avoid being clogged up by stones and other foreign substance.

Referring to the accompanying drawings:—Figure 1 is a plan view of a lawn mower constructed in accordance with this invention, the handle thereof being broken away. Fig. 2 is a side view of the roller. Fig. 3 is a front view of the roller. Fig. 4 is a side view in longitudinal section of the lawn mower shown in Fig. 1. Fig. 5 is a plan view of the lawn mower looking at the bottom side thereof. Fig. 6 is a detail view in perspective of the main frame of the lawn mower.

In carrying out the invention a main frame is provided for the lawn mower which consists of a longitudinal bar 1 formed with a curved portion 2 having projecting therefrom a V-shaped frame 3 and at its apex a tubular socket 4 projecting laterally therefrom; and a rearwardly extending straight portion 5 provided with reinforced bolt holes 6. The forward end of the curved portion 2 is formed with a laterally projecting plate 7 having a central bolt hole 8 and on each side thereof holes 9 for rivet pins.

10 indicates the usual form of traction wheel, which is formed of two disk shaped portions 10' each having a toothed periphery, and mounted upon the tubular socket 4 by means of a pivot pin 4' secured at its ends by a cross pin 5', the two disk shaped members 10' of the wheel being spaced apart from each other by the tubular socket 4 and forming by means of the inwardly projecting teeth 11 a circumferential cam slot 12. A fixed cutting blade 13 provided with tapering teeth 14 is secured to the plate 7 and to the fixed blade 13 is pivoted a reciprocating cutting blade 15 having tapering teeth 16 which are adapted to reciprocate beneath the teeth 14 and normally project between the teeth 14 in a plane below that in which the teeth 14 are located.

The reciprocating blade 15 is secured by rivets 17 to a plate 18 on the end of an arm 19, the plate 18 and the cutting blades 15 and 13 and the plate 7 being secured together by a bolt 20 and nut 21, the plate 13 being firmly clamped to the plate 7 and the blade 15 being pivotally mounted with the plate 18 on the bolt 20. The rear end of the arm 19 is formed with a reduced portion 22 on which is mounted a roller 23 located in the circumferential cam slot 12 between the teeth of the roller 10. The inner end of the reduced portion 22 is provided with an angular arm 24 which is connected by a coil spring 25 with an arm 26 projecting from the tubular hub 4. To the portion 5 of the frame is secured a handle 27 by means of bolts 28 projecting through the bolt holes 6 and secured by nuts 29.

When the lawn mower is operated the roller 23 is acted upon by the teeth 11 on the edges of the cam slot in the roller 10, so as to oscillate the arm 19 thereby communicating an oscillating motion to the blade 15 and its cutting teeth 16, the latter having a shearing action with the teeth 14 located above the same. The action of the teeth 11 of the wheel 10 forming the circumferential cam slot 12 is such as to cause the teeth 16 to oscillate past the teeth 14, the spring 25 causing a resilient pressure of the teeth 16 against the teeth 14.

It will be noted that by reason of the simple construction of the supporting frame of the wheel not only will the weight of the lawn mower be greatly reduced but also the cost of manufacturing will be lessened and the simplicity of the several parts will facilitate the dismantling or putting together of the machine.

What I claim is:—

1. In a lawn mower of the kind described, a frame, a traction wheel mounted on said frame and having a circumferential cam slot, a fixed cutting blade provided with teeth secured to said frame, an oscillating cutter blade provided with teeth and pivoted to said frame, an arm secured to said oscillating blade and having a roller located in said circumferential cam slot, and a spring connecting said arm with the roller frame.

2. In a lawn mower of the kind described, a frame consisting of a longitudinal bar having a depending frame provided with a tubular hub, a handle secured to said bar, a traction wheel mounted on said hub and formed with a circumferential cam slot, cutting teeth secured to one end of said bar, a plate with cutting teeth pivoted to said bar and having a rearwardly extending arm with a roller thereon mounted in said circumferential cam slot, an angular arm mounted on the frame of the mower, and a coil spring connecting said angular arm with the frame of the machine.

3. In a lawn mower of the kind described, a frame consisting of a longitudinal bar formed with a curved portion having a depending V-shaped frame with a tubular hub, and an arm projecting from said hub, said bar having a straight portion projecting from one end of its curved portion, a handle secured to said straight portion, said bar being formed with a laterally extending plate at the other end of its curved portion, a plate having cutting teeth fixed to said laterally extending plate at the end of the frame, a plate having cutting teeth pivotally mounted on said laterally extending plate, a roller formed with a circumferential cam slot and mounted on said tubular hub, an arm secured to said pivoted cutting plate and having a roller mounted thereon and located in said circumferential cam slot with an angular arm at the end of said roller arm, and a coil spring connecting said angular arm with the arm on the tubular hub.

In testimony whereof I hereunto affix my signature in presence of two witnesses.

OTTO KARCHER.

Witnesses:
 WILLIAM JACOB,
 J. E. LYONS.

---

Copies of this patent may be obtained for five cents each, by addressing the "Commissioner of Patents, Washington, D. C."